US006941184B2

(12) United States Patent
Ebert

(10) Patent No.: US 6,941,184 B2
(45) Date of Patent: Sep. 6, 2005

(54) EXCHANGE OF ARTICLE-BASED INFORMATION BETWEEN MULTIPLE ENTERPRISES

(75) Inventor: Peter S. Ebert, Menlo Park, CA (US)

(73) Assignee: SAP Aktiengesellschaft, Walldorf (DE)

(*) Notice: Subject to any disclaimer, the term of this patent is extended or adjusted under 35 U.S.C. 154(b) by 402 days.

(21) Appl. No.: 10/136,846

(22) Filed: Apr. 30, 2002

(65) Prior Publication Data

US 2003/0132853 A1 Jul. 17, 2003

Related U.S. Application Data

(60) Provisional application No. 60/347,672, filed on Jan. 11, 2002.

(51) Int. Cl.$^7$ .............................................. G06F 17/60
(52) U.S. Cl. .......................................... 700/115; 707/1
(58) Field of Search ............................. 700/115; 707/1; 705/28, 29, 22

(56) References Cited

U.S. PATENT DOCUMENTS

| | | | |
|---|---|---|---|
| 4,974,166 A | | 11/1990 | Maney et al. |
| 5,166,884 A | | 11/1992 | Maney et al. |
| 5,469,363 A | | 11/1995 | Saliga |
| 5,548,515 A | * | 8/1996 | Pilley et al. ................. 701/120 |
| 5,798,693 A | * | 8/1998 | Engellenner ............. 340/10.33 |
| 5,815,114 A | * | 9/1998 | Speasl et al. .......... 342/357.06 |
| 5,936,527 A | | 8/1999 | Isaacman et al. |
| 5,963,134 A | | 10/1999 | Bowers et al. |
| 5,971,592 A | | 10/1999 | Kralj et al. |
| 6,021,443 A | | 2/2000 | Bracho et al. |
| 6,032,127 A | | 2/2000 | Schkolnick et al. |
| 6,148,291 A | * | 11/2000 | Radican ........................ 705/28 |
| 6,160,481 A | * | 12/2000 | Taylor, Jr. ................. 340/573.4 |
| 6,172,596 B1 | * | 1/2001 | Cesar et al. ............. 340/10.41 |
| 6,177,860 B1 | | 1/2001 | Cromer et al. |

(Continued)

FOREIGN PATENT DOCUMENTS

| | | |
|---|---|---|
| DE | 4341880 | 6/1995 |
| DE | 19623893 | 12/1997 |
| DE | 19844631 | 4/2000 |
| DE | 19951060 | 5/2000 |
| DE | 19955120 | 5/2001 |
| EP | 0908643 | 4/1999 |
| EP | 0913758 A2 | 5/1999 |
| EP | 1174807 A1 | 1/2002 |
| GB | 2308947 | 7/1997 |
| WO | WO 00/45324 | 8/2000 |
| WO | WO 02/47014 | 6/2002 |

OTHER PUBLICATIONS

"They Physical Markup Language" by David L. Brock MIT–AUTOID. Feb. 2001.*
"EAN.UCC White Paper on Radio Frequency Identification"—Nov. 1999 EAN International.*
Hoffman, Kurt C., "Real–time Location Systems Take Asset Tracking to New Level," http://www.supplychainbrain.com/archives/10.01, Oct. 2001, 5 pgs., XP002259982.

(Continued)

Primary Examiner—Albert W. Paladini
Assistant Examiner—Michael D. Masinick
(74) Attorney, Agent, or Firm—Fish & Richardson P.C.

(57) ABSTRACT

Methods and apparatus, including computer program products, for making information available between enterprises. In one aspect, a method includes: receiving from a first enterprise multiple instances of tag-read-data for first articles including information read automatically from tags bound to the articles, article locations, and data derived from a first data processing system of the first enterprise; receiving from a second enterprise multiple instances of tag-read-data for second articles and data derived from a second data processing system of the second enterprise; using the tag-read-data to maintain virtual representatives for the articles in a virtual world, where tag-read-data received from either enterprise for a particular article is used to update the virtual representative corresponding to the article; and making available information from updated virtual representatives and from the virtual world to both the first enterprise and the second enterprise.

33 Claims, 6 Drawing Sheets

U.S. PATENT DOCUMENTS

| | | | |
|---|---|---|---|
| 6,195,006 B1 | 2/2001 | Bowers et al. | |
| 6,259,367 B1 | 7/2001 | Klein | |
| 6,292,894 B1 | 9/2001 | Chipman et al. | |
| 6,301,621 B1 | 10/2001 | Haverstock et al. | |
| 6,321,230 B1 | 11/2001 | Joslin et al. | |
| 6,671,698 B2 | 12/2003 | Pickett et al. | |
| 6,684,119 B2 | 1/2004 | Burnard et al. | |
| 2001/0000019 A1 | 3/2001 | Bowers et al. | |
| 2001/0040590 A1 * | 11/2001 | Abbott et al. | 345/700 |

OTHER PUBLICATIONS

"KnowNow Unveils 'n–way' EAI over the Internet," SEARCHWEBSERVICES, Jun. 28, 2001, 2 pgs., XP002259981.

Margulius, David L., "Dawn of Real–time enterprise," Infoworld, http://www.infoworld.com/article/02/01/17/020121fetca_1.html, Jan. 17, 2002, 2 pgs., XP002259980.

MIT Auto–ID Center, MIT–Autoid–WH–001, "The Networked Physical World", MIT Auto–ID Center, Dec. 2000.

David L. Brock, MIT Auto–ID Center, MIT–AUTOID–WH–002, "The Electronic Product Code", Jan. 2001.

Auto–ID Center, Technical Manual, "The Object Name Service", Version 0.5 (Beta), Oat Systems & MIT Auto–ID Center, Feb. 1, 2002.

KnowNow Product Brief: "KnowNow Architecture Overview", 2002.

Segall et al., "Content Based Routing with Elvin4" Jun. 2000.

WhitePaper, SAP® Consumer Products, From Demand Planning to Vendor Managed Inventory with SAP APO."DRP and VMI for the Consumer Products Industry", 1999.

Checkpoint Systems Inc., *Electronic Signatures technologies support supply chain logistics*, Retail News vol. 2, 2001.

Sanjay Sarma, *Auto–ID Center: Lessons Learned*, Auto–ID Center–MIT, Nov. 23, 2001.

Auto–ID Website—Technology Section, *Introduction to Auto–ID*, http://www.autoidcenter.org/technology, Jan. 7, 2002.

Sylvia Tiisetso Khabele, *RFID Security, CSC400W: Network and Internetwork Security*, skhabele@cs.uct.ac.za, May 18, 2001.

Kevin R. Sharp, Senior Technical Editor, IDSystem.com, *Planning for RFID Ubiquity*, http://www.idsystems.com/reader/2000_07/plan0700.htm, Jul. 2000.

Raghu das et al., *The Internet of Things*, IDTechEx Ltd., http://www.idtechex.com/book9.html, 2001.

David L. Brock, *The Physical Markup Language*, MIT Auto–ID Center, Feb. 2001.

George Cole, *The little label with an explosion of applications*, Financial Times–FT.com, http://news.ft.com/ft/gx.cgi/ftc?pagename=View&c=Article &cid=FT30404MGWC, Jan. 14, 2002.

EAN International, Uniform Code Council, Inc., *EAN.UCC White Paper on Radio Frequency Identification*, Nov. 1999.

Sanjay Sarma et al., *White Paper—The Networked Physical World*, MIT Auto–ID Center, Oct. 1, 2000.

John Sterner, *Radio Frequency ID: A New Era for Marketers?*, Consumer Insight, Winter 2001.

Mary Ann Falkman editor, *RFID smart labels track chilled foods door to door*, Packeting Digest, Nov. 2000.

Cheryl Rosen, *RFID Chips Put To The Test*, Informationweek.com, http://www.informationweek.com/story/IWK20010628S0008, Jul. 2, 2001.

M–Lab—A Joint Initiative of ETH Zurich and HSG, *The Mobile and Ubiquitous Computing Lab—Project Plan*, www.m–lab.ch, English version 1.02e, St. Gallen/Zurich, Jun. 21, 2001.

Rachel Melcer, *P&G's Vision*, Business Courier, May 18, 2001.

Elgar Fleisch et al., *From computing visions to show cases*, M–Lab, First M–Lab Steering Committee Meeting, Feb. 22–23, 2001, Zurich.

Charles J. Murray, *Motorola cuts bar code replacement effort*, EE Times, Nov. 16, 2001.

Savi Technology Inc. Press Release, *CHEP to deploy Savi Technology's Asset Management Software*, Nov. 6, 2001.

Jay Wrolstad, *American Airlines Deploys Wireless System to Monitor Cargo*, CRMDaily.com, Oct. 12, 2001.

Jay Wrolstad, *Wireless tags help grocers deliver fresh food*, CRM Daily.com, Oct. 2, 2001.

SAMSys, Inc. press release, *International Paper selects SAMSys Technologies as primary RFID reader supplier*, Jan. 5, 2001.

Infineon press release, *Infineon enters fast growing "smart label" market with my–d, defines new paradigm for cost effective radio frequency identification solutions*, Sep. 11, 2001.

* cited by examiner

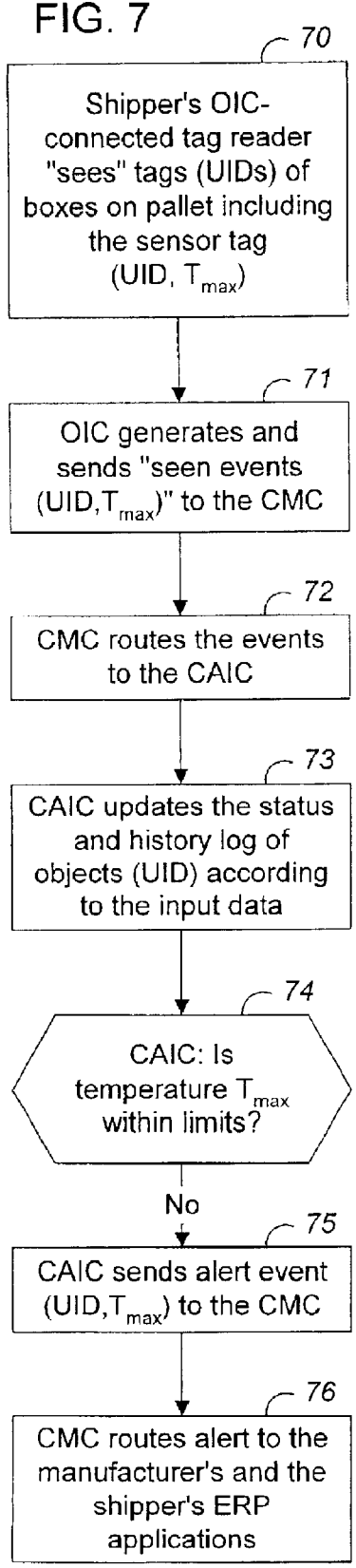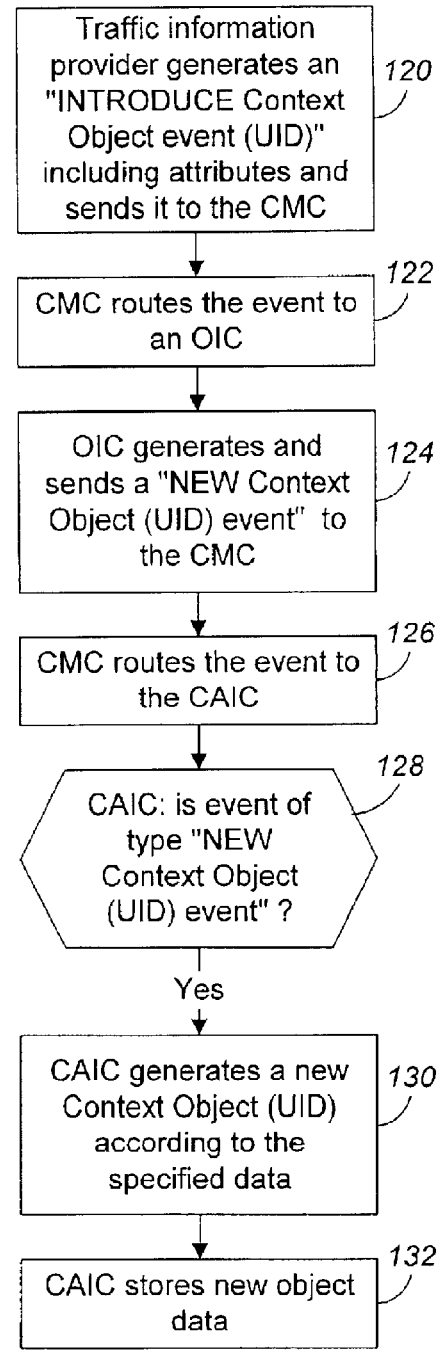

EXCHANGE OF ARTICLE-BASED INFORMATION BETWEEN MULTIPLE ENTERPRISES

CROSS-REFERENCE TO RELATED APPLICATIONS

This application claims the benefit of U.S. Provisional Application No. 60/347,672, filed on Jan. 11, 2002.

BACKGROUND OF THE INVENTION

The present invention relates to tracking taggable objects.

A conventional system for tracking tangible objects usually includes computing devices and software. Such systems maintain information that indicates the status, such as a current location, of an object being tracked. This can be thought of as a virtual world.

With conventional systems, there can easily be a discrepancy between the actual status of the object and the status as indicated by the system. Discrepancies are often caused by flawed manual data input and system limitations. As a result of such problems, conventional systems can have a distorted and fragmented picture of reality. In addition, most conventional systems see with a very limited scope and resolution, for example, systems that can only distinguish between product classes and quantities and not between individual items.

SUMMARY OF THE INVENTION

This specification describes methods and apparatus, including computer program products, for context-aware and real-time tracking of tagged articles.

The word 'article' is used in this specification to refer to a real, tangible object, so as to avoid ambiguity from use of the word 'object', which will in the following text be used only to refer to a data processing construct. The word article will further be limited to real things that are amenable to being tagged with a tag that can be read by some device.

In general, in one aspect, the invention features systems and methods, and components configured to perform aspects of the methods, for tracking articles. A system in accordance with the invention includes a tagging component that includes information specifying standards for tagging one or more articles with tags, each tag including a globally unique identifier; an object interface component that includes devices for communicating with the tags and that further includes devices for receiving context information; a context-aware intelligence that includes logic for processing context information and logic specifying actions for the system to perform in response to the context information; and a communication middleware component for communication between and among the components of the system and for communicating with devices external to the system.

In general, in another aspect, the invention features systems and methods, and components configured to perform aspects of the methods, for making information available between enterprises. A method in accordance with this aspect performs the actions of receiving from a first enterprise multiple instances of tag-read-data, each instance including information read automatically from a tag bound to an article including at least a unique digital identifier, each instance also including status information including a location of the corresponding tag and its bound article, the multiple instances of tag-read-data received from the first enterprise collectively including information read from tags bound to first multiple articles, the tag-read-data including data derived from a first data processing system of the first enterprise; using the tag-read-data received from the first enterprise to maintain virtual representatives in a virtual world, the virtual representatives including a virtual representative for each one of the multiple articles, each virtual representative representing the status of its corresponding article; receiving from a second enterprise multiple instances of second tag-read-data, each instance including information read automatically from a tag bound to an article including at least a unique digital identifier, each instance also including status information including a location of the corresponding tag and its bound article, the multiple instances of tag-read-data received from the second enterprise collectively including information read from a tag bound to at least one of the first multiple articles, the tag-read-data received from the second enterprise including data derived from a second data processing system of the second enterprise; using the tag-read-data received from the second enterprise to maintain virtual representatives in the virtual world, the virtual representatives including a virtual representative for each of the second multiple articles, each a virtual representative representing the status of its corresponding article, where tag-read-data received from either enterprise for a particular article is used to update the virtual representative corresponding to the article; and making available information from updated virtual representatives and from the virtual world to both the first enterprise and the second enterprise.

Advantageous implementations can have one or more of the following features. The information in the virtual world about articles is mapped to virtual-world-wide standardized dimensions of time, three-dimensional space, and unique identity, whereby articles can be tracked relative to each other through space and time. The location of articles is represented in the virtual world by latitudes, longitudes, and altitudes. The method also receives sensor information obtained from a sensor associated with an article; and updates the virtual representative of the article with the sensor information. The method also updates the virtual representatives whenever that status of their associated articles changes as reflected in information received by a system operating to maintain the virtual world. The method also receives one or more instances of context information, each instance describing an associated non-taggable physical circumstance, the context information indicating a status including a location of the circumstance, the multiple instances of context information collectively including information describing multiple circumstances; uses the received context information to maintain a virtual representative for each of the associated circumstances in the virtual world, each virtual representative representing the status of its corresponding circumstance; and detects interactions occurring in the virtual world between the circumstances and the articles as represented by their respective virtual representatives. The method also generates an alert for a user of the virtual world whenever a detected interaction is determined to affect any of the articles represented in the virtual world. The method also receives hierarchy information describing a hierarchy among articles represented in the virtual world; and uses the received hierarchy information to create a virtual representation of the hierarchy. The hierarchy is a relationship among articles in which some particular articles are contained within another article. The tags bound to the first multiple articles include radio frequency identification tags. Each of the radio frequency identification tags carries an ePC electronic product code as a unique identifier.

The invention can be implemented to realize one or more of the following advantages. A system in accordance with the invention can be aware of a virtually unlimited number of articles as well as of other things in the real world and relationships between and among articles and other things. The system can be implemented at a wide range of scales. The architecture of the system is easy to work with and can be put to a wide variety of applications simultaneously. The architecture supports the tracking of pretty much anything as an article or as a circumstance that influences an article. Similarly, the architecture permits every kind of attribute to be associated with a tracked article or circumstance. Hierarchical and other relationships can be defined between or among tracked things and used for tracking things in the relationships. The architecture is open to any kinds of data sources, including all kinds of sensors and scanners, as well as systems that provide circumstantial information, for example, weather, traffic conditions, transportation schedules such as air and rail schedules, time of arrival data, and so on. The system provides a generic and intelligent glue between the real world and a virtual world that can be used to provide context-aware and real-time tracking of articles.

The system inherently integrates context-aware intelligence. Such intelligence enables the system to know which geospatial events will affect which of the articles being tracked and take action in response to such events. The system can provide dynamic context-aware intelligence with generic geospatial abilities. Based on available data and telemetry, the system can understand where, how, and what articles are at a specific time in relation to each other and, furthermore, invoke actions according to defined rules.

The system can be integrated with existing software and hardware systems using non-proprietary, open interfaces. With such interfaces, the system is compatible with existing systems without the need for plug-ins or upgrades into the existing systems. For example, the system can provide non-proprietary, open interfaces to integrate virtually every kind of tag, tag reader, scanner, sensor, and application. The system can be implemented to include applications that can generically read data from, and write data to, article tags. The system can include generic tracking of real-time telemetry. The system can integrate existing Geographical Information Systems ("GIS") and data.

The system supports development of a whole range of new or enhanced applications across industries. Such applications include and are not limited to those relating to supply chain management, asset tracking and management, security and access control, transportation, toll collection, point of sale, and baggage handling.

The system is scalable from a local to a global level. That is, the system can be implemented to support a business unit, a single company, or a group of companies, in one or more industries. The system can track articles and circumstances in real time. The system can provide current and past state of articles or groups of articles and can do so remotely, for example, through wireless communication or through a network such as the Internet.

Through a variety of initiatives, in the future a large number of articles of all kinds will be uniquely tagged and identifiable globally, in many cases through automatically operating sensors. The system can operate across industries and companies to provide smart, enterprise-level article tracking solutions. The system provides open, generic, and configurable business methods that can be applied across multiple industries and applications. The business methods allow customers to define generically and introduce virtual representations of articles to a software system over a network, attach rules that invoke actions based on dynamic context data, and query the system for a multitude of attributes related to, or derived from, the present and past contexts of the tracked objects. Tracking data can be shared among partners based on field-level authentication definitions.

The system is accessible to users and external applications through non-proprietary interfaces, e.g., Web browsers or self-describing documents such as XML (Extensible Markup Language) documents. The system can track a large number of uniquely tagged articles and their telemetry data, if any, through time and space. The system provides open, non-proprietary interfaces for sensors, devices, and services that track and provide the location of, and/or telemetry data from, articles or their environment to the system. The system also provides open, non-proprietary interfaces for sensors, devices, and services that write data to physical articles or their tags that can receive such data. The system provides user interfaces, application interfaces, and tools to define virtual representations of uniquely tagged articles and hierarchies of them, including specific attributes and methods; to define rules that can invoke actions based on dynamic context data known to the system; to define virtual representations of physical constraints or other influences that can affect articles; to define sophisticated data access filter settings on an attribute level of data objects representing articles and other real-world things; to query the system for, and to visualize, a multitude of characteristic related to, or derived from, the present and past contexts of the tracked articles; and to share article-related data between or among partners over a network.

The system can be used by diverse entities for their own purposes, and each entity can make part or all of the information about its tagged articles, its data input devices, and its tracked circumstances visible to other entities using the system. The other entities can use this information and get the benefit of the experience and history of the entire community of users of the system, regardless of the purposes for which the information was originally gathered or provided, and without requiring in any respect that the future uses and benefits of the various contributions, or their advantageous interactions, be contemplated at the time the contributions are made.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 7 illustrates an update operation in accordance with the invention.

FIG. 9 illustrates a feed operation in accordance with the invention.

Like reference numbers and designations in the various drawings indicate like elements.

DETAILED DESCRIPTION

A System for Real-time and Context-aware Tracking

A system in accordance with the invention receives information in an open, non-proprietary form, concerning articles and circumstances affecting articles. This information becomes physical objects and context objects, and their attributes, in the system.

In this specification, the term 'physical object' will be used to refer to data that corresponds to and is used as a representation of any article. In any particular implementation, a physical object can be implemented as an object in the object-oriented programming sense of the term; however, it can also be implemented in any other convenient way, for example, by a record in a database. Similarly, the term 'context object' will be used to refer to data that corresponds to and is used as a representation of tangible and intangible things, including, by way of example, relationships and events. Generally, context objects are created and maintained because they represent something—which may generically be called a circumstance—that has the potential of affecting an article represented by a physical object. One example of circumstances are geospatial events, which can include, for example, hurricanes which can impede the transit of a transport ship carrying the articles being tracked, a labor strike which can prevent the unloading of the articles from the transport ship, and a traffic accident which can delay delivery of the articles. The term hierarchies refers to associations or relationships between and among articles and circumstances. For example, given a can in a pallet of cans, events that affect the pallet also affect the can. Context objects can represent hierarchies.

The system receives information from a variety of sources, which can be coupled to the system through a network such as the Internet or directly. The system can be configured to receive information from sources with proprietary or non-open interfaces, in which case the format of the information is converted to be compatible with the system. The system includes data input devices, for example, tag readers, sensors, and scanners. Through such devices, the system can continuously track and log the state of the articles and circumstances represented by physical and context objects. The state of an article can includes its status, attributes, and location.

Figure 1:
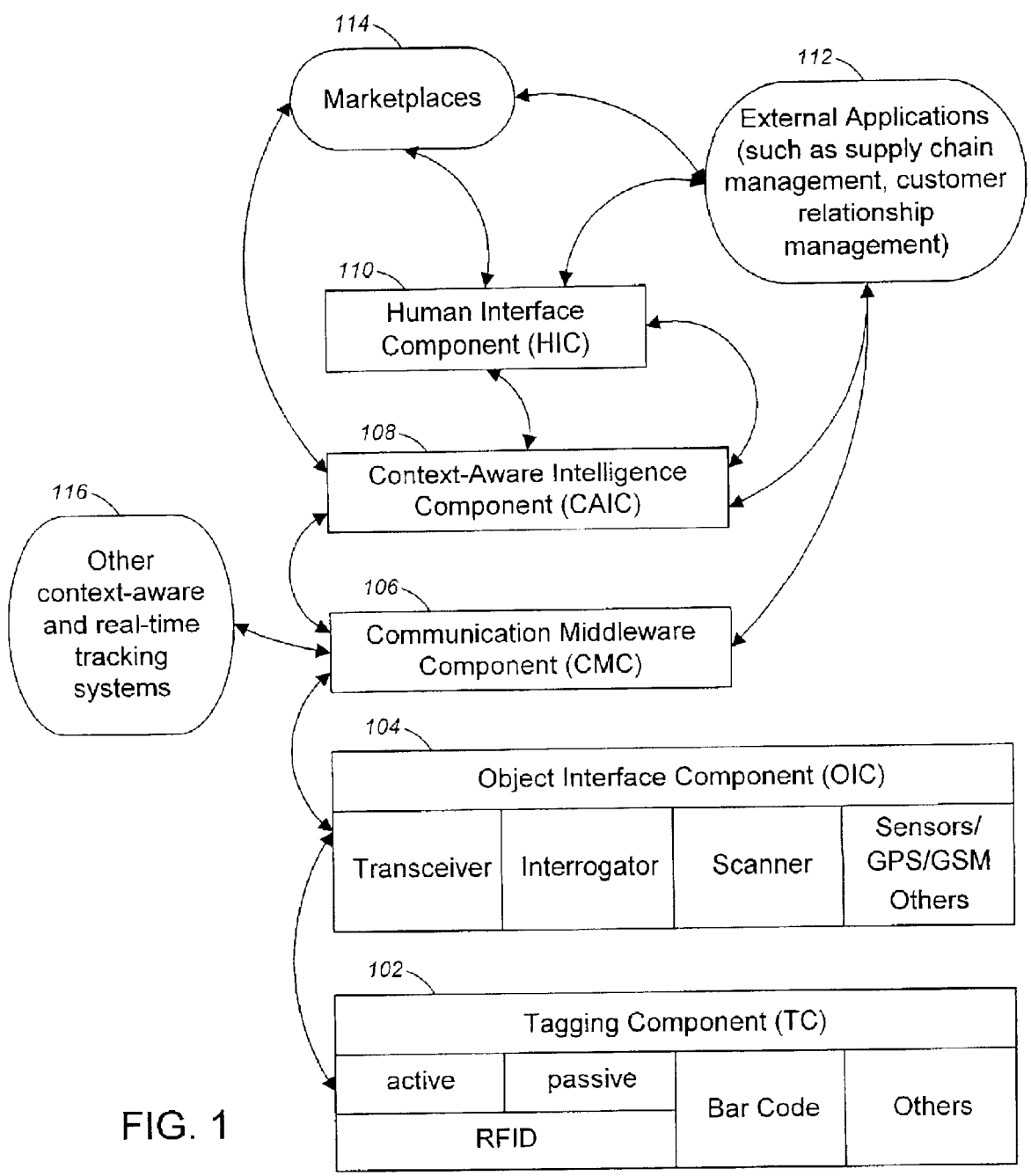
FIG. 1 shows a system in accordance with the invention.

As shown in FIG. 1, a context-aware and real-time tracking system in accordance with the invention can be implemented with a Tagging Component ("TC") 102, an Object Interface Component ("OIC") 104, a Communication Middleware Component ("CMC") 106, a Context-Aware Intelligence Component ("CAIC") 108, and a Human Interface Component ("HIC") 110. In an alternative implementation, the HIC 110 is integrated with the other components. Each of these components can be implemented as computer programs executing on one or more computers and controlling devices performing data acquisition, output, and transmission functions. FIG. 1 also shows communication flows (represented by arrows) between and among the components of the context-aware and real-time tracking system as well as between the system and external applications 112, external marketplaces 114, and other, external context-aware and real-time tracking systems 116. The communication flows can be implemented in any convenient, open fashion, such as through the exchange of XML documents.

The components are arranged in a distributed, real-time, and event-based architecture. Each or all components or any combination of the system's components can be implemented on a micro up to a macro level. Micro level implementation refers to implementation on a single device and macro level implementation refers to implementation on multiple devices such as computers in a network. Each component can be distributed across multiple devices, including computers, that are interconnected by a network. Each component can be made up of, that is, implemented as, multiple different applications, which in the aggregate perform the functions of the component. The described component architecture allows the system to group and scale functionality from a local to a global level while assuring that hardware and software can be readily integrating using non-proprietary, standard interfaces.

A component can include software systems—which includes any software, applications, computer program products—and related devices. For example, a software system can be applications and servers operating on an enterprise-level. Communication between or among software systems can take place through a communications network. The components expose non-proprietary, open interfaces for services that are accessible through a network, such as one based on open standards like XML over HTTP. The following text further describes the components.

Tagging Component

Articles introduced to the system are tagged with a unique identifier by any available article-level tagging technology, for example, active and passive Radio Frequency Identification ("RFID") tags, barcodes, and tags that can be applied on a molecular basis.

When the system first becomes aware of an article or circumstance, it will be said to s be introduced to the system; and a corresponding object is created. This physical or context object will also be said to be introduced to the system, and it will be referred to as an "introduced object." The system assigns a specific dynamic n-dimensional context and attribute space to introduced objects. For example, the system can assign owner, price, lot number, and temperature to an introduced object. Optionally, the system attaches specific rules to the introduced objects. For example, the system can attach a rule specifying that if the temperature of the corresponding article reaches level y, then cause action z.

The TC 102 of a particular implementation specifies in an open way which tagging technologies can be used with the system and how they are used. The TC 102 includes a distributed knowledge system based on Internet technology. Specifically, the TC 102 generally will include and provide a specification of the globally unique identifier and how to apply it; catalogues describing the specifications of compliant tags, their reader/writer hardware and all aspects concerning their use; specific standards and laws that apply to the tagging of articles; specifications of standardized communication and context data formats and interfaces; specifications of read and write processes, processing and transmission requirements for active tags, and telemetry data specifications; best industry practices, that is, knowledge relating to selection and deployment of tags and tag content; security and authorization requirements and standards; benchmarks; implementation guides; and frequently asked questions.

In addition, the TC 102 can provide tools, content, software development kits, and applications that enable manufacturers, system integrators, and customers to identify, validate, and implement optimal article-tag-reader/writer combinations and standards for specific scenarios. The TC 102 can be built with any software development environment to fulfill the above-mentioned requirements.

Object Interface Component

The OIC 104 transforms data from attached hardware to the system and vice versa. The OIC 104 can also perform any required local processing.

The OIC 104 is a sophisticated, generic, bi-directional, and smart software interface between the system and the real world. Here, physical objects and context objects are introduced to the system and their status and telemetry data are received, filtered, transformed, pre-processed, and processed as necessary. Because physical objects and context objects can be implemented to carry rules that can trigger alert events or cause actions depending on current context or status data, the OIC 104 can be implemented to embed or link to a rule engine to process these kinds of rules. By customizing the OIC 104, customers can specify what the OIC 104 should do if one of the customer's tag readers detects an article tag—which will have an identifier that the system can map to a unique system identifier ("UID")—for the first time. Such actions can include communication with external applications, for example, ERP (Enterprise Resource Planning) applications.

The OIC 104 also generically specifies and validates how tag interface hardware, for example, RFID readers, barcode scanners, polymer tag readers, and sensors, and its operating software communicate with the system. Consequently, the OIC 104 acts as a generic software wrapper around all tag-specific read/write devices, which provides standardized integration; data validation, filtering, and transformation; bi-directional, event-based secure communication; and data pre-processing.

Because the OIC 104 is not only able to receive data but also can send data to hardware and software attached to the system, and ultimately to the tagged articles themselves, the system can use the OIC to write data to such articles or control them remotely, if they are configured for such control.

The OIC 104 can apply and enforce a sophisticated security scheme for all inbound and outbound communication, for example, one based on digital certificates. The OIC 104 can be built with any software development environment that fulfills the above-mentioned requirements.

Communication Middleware Component

The components communicate by sending and receiving standardized events, which the components can send and receive through a network. The CMC 106 validates and routes standardized events between the OIC 104 and the CAIC 108 (which will be described below) and, in general, between or among any of the system components. The CMC 106 can also validate and route standardized events between or among any of the system components and other applications, devices, and components.

The CMC 106 performs functions such as data and authentication validation, storage and retrieving, archiving, data decryption/encryption, and multicasting of events. The CMC 106 can apply and enforce a sophisticated security scheme for all inbound and outbound communication, e.g., one based on digital certificates. The CMC 106 can be built with any software development environment that fulfills the above-mentioned requirements.

Context-aware Intelligence Component

The CAIC 108 includes logic that provides the intelligence for the system to receive, process, and respond to queries concerning what, where, and how tagged articles represented by introduced objects are, were, or will be at a specific time in relation to each other or in relation to features of the real world. The CAIC 108 offers open internal and external interfaces to plug-in additional features such as applications and rules, extending its generic set of services.

As mentioned earlier, the system can include context objects that represent events that potentially can affect articles. Examples of such events include hurricanes, points or areas of high temperatures, and slow traffic. Context objects can also describe a specific relationship between or among articles. Context objects can also describe attributes of articles. Examples of attributes include a geospatial route, a velocity, and a destination. Telemetry readings of sensors can also be introduced as context objects.

The CAIC 108 includes a database that allows the system to store and retrieve the current state of introduced objects as well as the history of state changes of these objects. This database can process geospatial data and can be distributed over multiple computers and multiple sites.

The CAIC 108 can apply and enforce a sophisticated security scheme, such as one based on digital certificates, for all inbound and outbound communications. The CAIC 108 can be built with any software development environment that fulfills the above-mentioned requirements.

Human Interface Component

The HIC 110 generically integrates a multitude of technologies suited to allow human beings easy access to and control of the system. These technologies include, e.g., HTML or XML-based, voice controlled, stylus controlled and multi-modal human interfaces including all kinds of data visualization technologies and the like. The HIC 110 separates the application and infrastructure layer from the representation and human interaction layer.

The HIC 110 can apply and enforce a sophisticated security scheme, such as one based on digital certificates, for all inbound and outbound communication. The HIC 110 can be built with any software development environment that fulfills the above-mentioned requirements.

Operation

Introducing Objects to the System

In operation, physical and context objects can be introduced to the system using standardized parameterized events that include at least a system UID. Additionally, specific attributes, methods, and rules can be attached to the introduced object (e.g., current temperature, current owner, manufacturer, temperature exceptions, alerts, rules, data access, and authority specifications).

Unique Identifier

Figure 2:
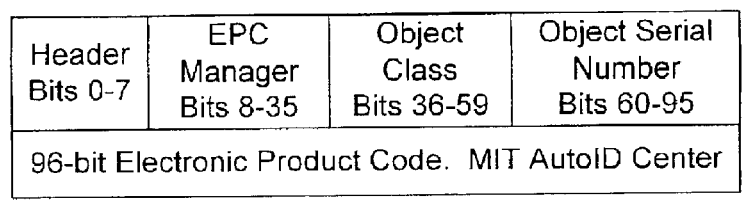
FIG. 2 shows an example of a unique identification code in accordance with the invention.

The system maps all introduced objects to a system UID. For the system to be able to scale from a local to a global level and also integrate satisfactorily with other systems, this identifier should be globally unique. If the referent of the object has a tag with an identifier that is globally unique, that identifier can be—but need not be—used as the UID. One such unique identifier is the Electronic Product Code (ePC) of the MIT (Massachusetts Institute of Technology) AutoID Center. FIG. 2 illustrates the format of the ePC.

The system can partition the UID to enhance search performance.

One way of uniquely tagging articles is to attach RFID chips to them. These electronic chips hold at least a relatively unique identifier that can be read by specific reader devices. More sophisticated chips feature dynamic data storage with external read/write abilities and smart chips include built-in processing power. One advantage of RFID technology is the ability to automatically identify a multitude of articles over a distance without the need to disassemble or unpack them. Alternatively, the system can use other technologies, such as item-level bar codes, magnetic tags, and polymer tags, to tag physical objects with identifiers that can be mapped to a system UID.

Events

The system communicates internally and externally by using events. Table 1 provides an example an XML document representing such an event. Any convenient form of representing events can be used.

TABLE 1

```
<event>
    <type>SEEN_OBJECT</type>
    <parameters>
        <sender>
            <UID>xx.xxxxxxx.xxxxxx.xxxxxxxxx</UID>
            <type>RFID_READER</type>
        </sender>
        <telemetry>
            <UID>xx.xxxxxxx.xxxxxx.xxxxxxxxy</UID>
            <temperature>
                <unit>C</unit>
                <value>45.43</value>
            <temperature>
        </telemetry>
    </parameters>
</event>
```

Time, Space, Unique Identity, Context, Hierarchy

The system maps every introduced object to system-wide standardized dimensions of time, space (3-D), unique identity (UID), and context. The system saves input data with system-wide synchronized time stamps. Space refers to everything from a point (pure location) to a complex three-dimensional polyhedron in a three-dimensional space (representing, e.g., location, size, and shape of an article). Context can be n-dimensional (representing, e.g., attributes such as temperature, velocity, and weight).

Each dimension is measured in system-wide standard units, e.g., units based on international standards like Coordinated Universal Time ("UTC"), and the International System of Units ("SI").

Because time and space are universal dimensions, the system's core space is compatible with all other systems, such as GIS, that also work in these dimensions or subsets of them. Introduced objects can be part of dynamic hierarchies. Hierarchies can be described by context objects.

Based on internal or external event data, the system tracks and logs the state of articles represented by introduced objects within the above-described space. It is then able to answer questions or provide alerts about the state of, and relationships between, introduced objects in that space, such as:

Where was article (UID) on Dec. 12, 2001?

Where are all articles (UID) of type x within a radius of y of address z?

Which of my supplies are affected by tropical storm x?

Where are the nearest spare parts for asset x and how fast could they be delivered to plant y?

Where are all delivered products with lot number x right now?

Where is the nearest demand for my products x with an expiration date before y?

Alert! Chemical assets x and y are stored too close to each other.

Alert! Employee x is not allowed to carry laptop y out of building z.

Based on historical data, statistical or other methods, the system can also derive the future state or behavior of introduced objects or groups of them.

Direct or Derived Location Data

The location of articles can be described to the system in a variety of ways. An example for a direct description is a latitude, longitude, and altitude data set configured in a standard way.

An example for a derived location description is the street address of a facility where a tag reader is located. The system maps the street address of the tag reader to the system's standard coordinate system, assumes that the article (as represented by its UID) encountered by the tag reader is near the tag reader, and associates the reader's location with the article's location.

Object-level Data Access Authorization Model

The object model may include a UID, attributes, and a definition of which system users have read/write/change authorities of which attributes, methods, and rules. The system assigns to each of its users a globally unique identifier, which may be based on the Electronic Product Code (ePC), the EPC Manager part of the ePC, or the like.

Depending on the assigned authorization and using standardized parameterized events, system users write, read, and change data of introduced objects. Object data access is dependent on defined authorization settings. Table 2 provides an example an XML document representing a physical object implementing the described authorization model. This is just an example, however, and any convenient representation can be used.

TABLE 2

```
<physical_object>
    <UID>xx.xxxxxxx.xxxxxx.xxxxxxxxx</UID>
    <current_owner>
        <OUID>xxxxxxx</OUID>
        <change_authorization>
            <OUID>xxxxxxx</OUID>
        </change_authorization>
    </current_owner>
    <price>
        <unit>USD</unit>
        <value>230000</value>
        <read_authorization>
            <OUID>xxxxxxx</OUID>
            <OUID>yyyyyyy</OUID>
            <OUID>zzzzzzz</OUID>
        </read_authorization>
        <write_authorization>
            <OUID>xxxxxxx</OUID>
        </write_authorization>
        <change_authorization>
            <OUID>xxxxxxx</OUID>
        </change_authorization>
    </price>
</physical object>
```

Communication Security Scheme

The system includes a generic authentication and security scheme (such as one based on digital certificates and encryption) for communication with and between the components and for communication to other systems and external devices.

Applications of the System

One application of the system will now be described in which the system tracks and logs location and temperature of high quality fish products that a Shipper Y is transporting from a Manufacturer X to a Retailer Z.

The following generally describes how the system accomplishes the described functions. Manufacturer X boxes the products and attaches a RFID tag to each box. The RFID tag includes a UID and, in addition, can store an expiration date, a maximum temperature threshold, and a maximum encountered temperature reading ($T_{max}$). Manufacturer X loads the boxes on pallets and attaches an active, recyclable temperature-sensor device to each pallet. Alternatively, and at greater expense, such a sensor could be attached to each box. These devices have an RFID tag attached that includes a UID and, in addition, can store temperature readings and a maximum encountered temperature reading ($T_{max}$). The devices periodically measure the current temperature and store the readings on their attached RFID tag. Alerts are triggered when temperature exceeds a specific threshold. Upon arrival at the retailer, updated expiration dates and maximum encountered temperature data based on the temperature history logs of the sensor devices is written to the RFID tags of each box.

Manufacturer X wants to decrease the number of boxes rejected by Retailer Z ("rejects") for which Shipper Y is to be held responsible, for example, boxes exposed to high temperatures during shipping. Shipper Y wants to gain market share by providing better customer satisfaction by ensuring full visibility of the current location and temperature of shipments. In addition, Shipper Y wants to detect quality problems and theft caused by contractors. Retailer Z wants to be able to identify and reject spoiled products upon arrival and, thus, cut costs by decreasing returns while, at the same time, achieve higher customer satisfaction.

Figure 3:
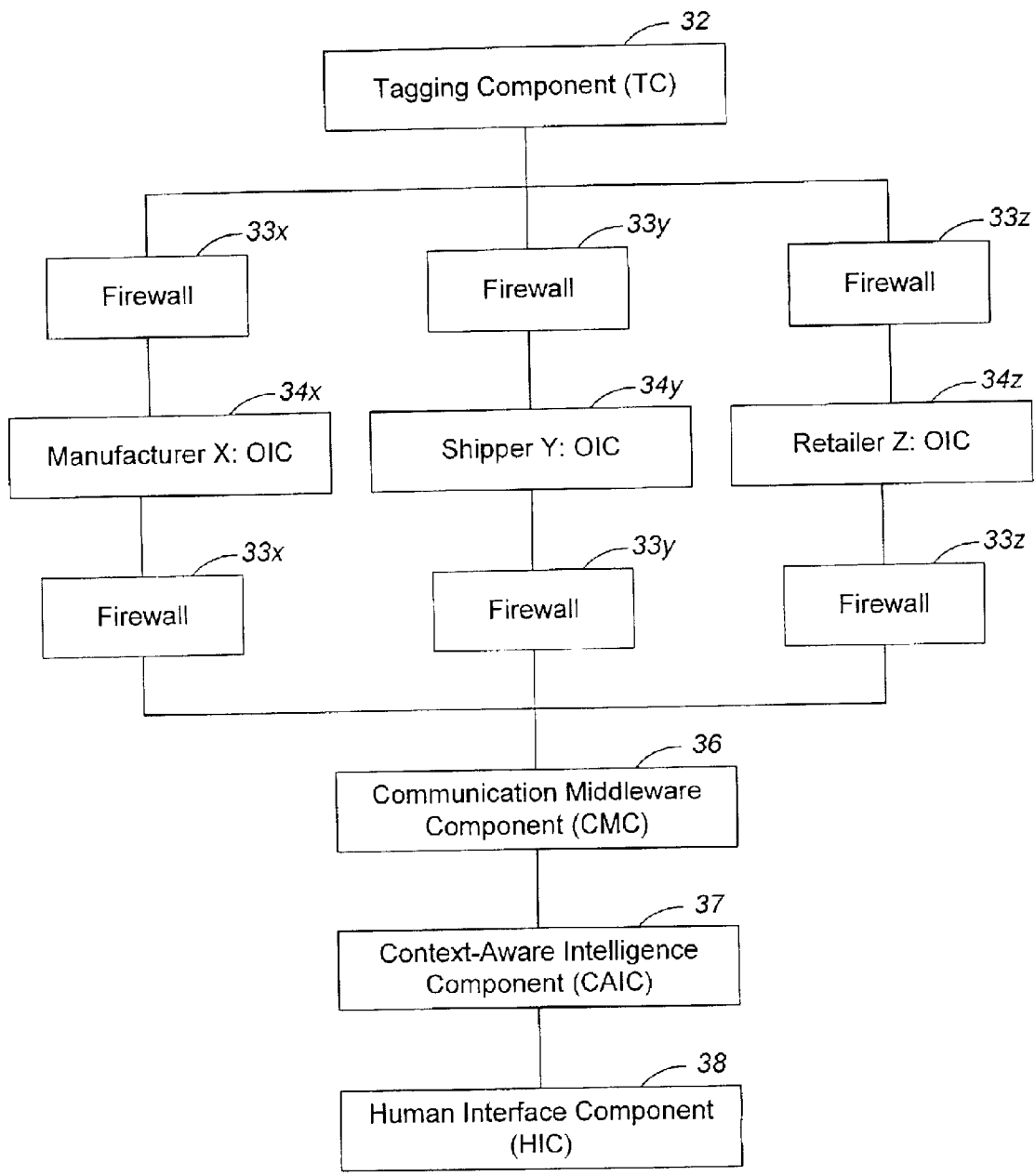
FIG. 3 shows one implementation of the invention.

The following describes in detail how the system helps each party achieve its goals. FIG. 3 illustrates one implementation in which Manufacturer X, Shipper Y, and Retailer Z procure and implement a local installation of the Object Interface Component (OIC) 34$x$, 34$y$, 34$z$ of the system behind their respective firewalls 33$x$, 33$y$, 33$z$. In addition, they jointly use the Tagging Component (TC) 32, Communication Middleware Component (CMC) 36, Context-Aware Intelligence Component (CAIC) 37 and Human Interface Component (HIC) 38 of an external application service provider, who provides these services through a network such as the Internet. Alternatively, each party can subscribe to an implementation of the system which is provided by a service provider. In this latter case, each party need not procure and install an OIC. In yet an another alternative, one or more of the parties can install all five component of the system for use by all of them. In this case, the parties need not subscribe to a service provider; their CMCs can communicate by sending events over a network such as the Internet.

Based on the specifications, standards, best industry practices, and other information obtained from the TC, Manufacturer X procures read-write RFID tags and interrogators compliant with the above-described product and scenario requirements (e.g., active or passive RFID tag, frequency, reader range, temperature sensor built-in, memory size, price point, case material, and bonding requirements). Based on the specifications, standards, best industry practices, and other information obtained from the TC, Shipper Y and Retailer Z each procure a number of RFID interrogators (which can be read-only) that are compliant with the RFID tags of Manufacturer X and the system.

Figure 4:
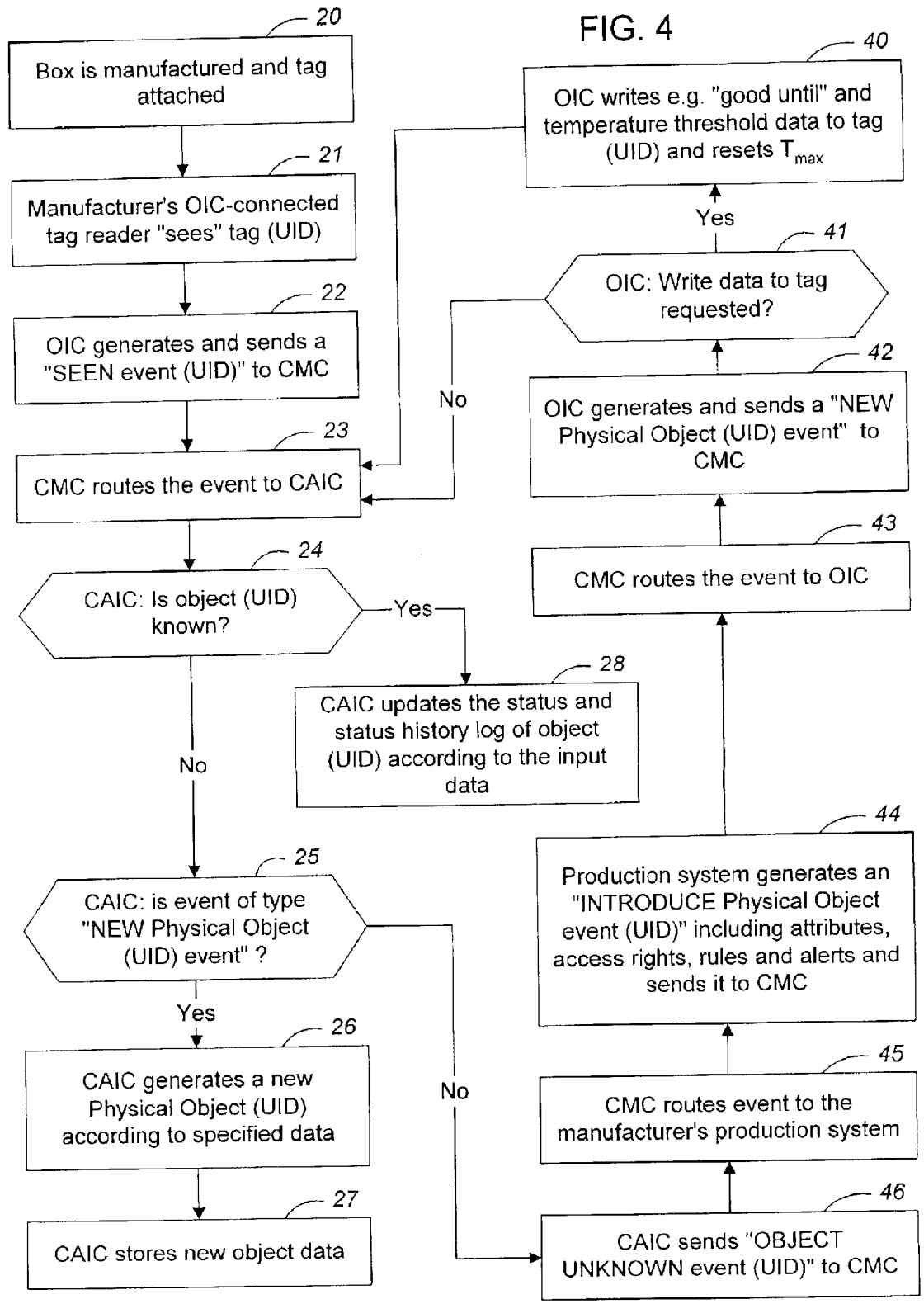
FIG. 4 illustrates an article object introduction process in accordance with the invention.

When Manufacturer X produces a box of products, Manufacturer X attaches one RFID tag and introduces to the system its unique identifier, allowed temperature ranges, and initial expiration date to the system. FIG. 4 illustrates this introduction operation. A box is manufactured and a tag is attached (step 20). The manufacturer's OIC-connected tag reader senses the tag and reads its UID (step 21). The OIC generates and sends a SEEN event including the UID to the CMC (step 22), which routes it to the CAIC (step 23). If an object for the UID is known, the CAIC updates the status and status history log of the object according to the input data ("yes" branch of step 24; step 28); otherwise, the CAIC determines whether the event is a NEW physical object event (decision step 25). If the event is a NEW object event, the CAIC generates a new physical object for the UID according to the specified data (step 26) and stores the new object data (step 27). Otherwise, the following actions occur. The CAIC sends an OBJECT UNKNOWN event for the UID to the CMC (step 46). The CMC routes this event to the manufacturer's production system (step 45), which generates an INTRODUCE physical object event for the UID with attributes, access rights, rules, and alerts and sends this event to the CMC (step 44). The CMC routes this event to the OIC (step 43), which generates and sends a NEW physical object event for the UID to the CMC (step 42). The OIC also determines whether there is a request to write data to the tag (step 41). If there is, the OIC writes the data to the tag (step 40). In this illustration, the data is a "good until" date, a temperature threshold, and a maximum encountered temperature reading (step 40). In any case, the NEW physical object event is routed by the CMC to the CAIC (step 23) for handling as has been described.

Figure 5:
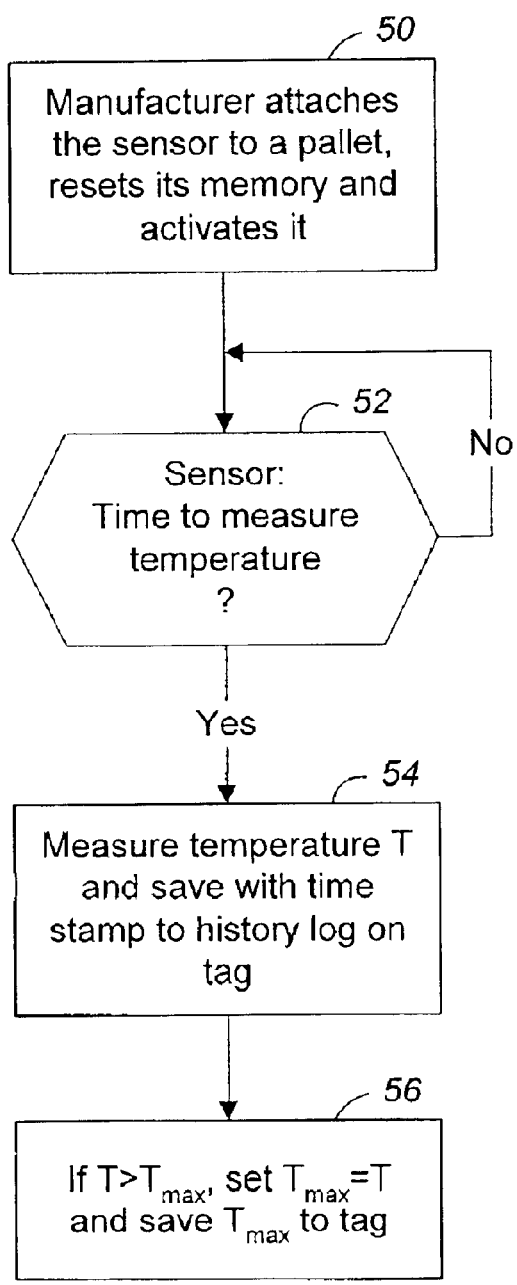
FIG. 5 illustrates the operation of a temperature sensor device and an RFID tag in accordance with the invention.

As shown in FIG. 5, when Manufacturer X loads a pallet for delivery, Manufacturer X attaches an active temperature sensor to the pallet, resets the memory of the sensor and activates it (step 50). The sensor measures temperature on a time schedule (step 52), saving the measured temperatures with time stamps to a history log on the tag (step 54). If the temperature exceeds the maximum encountered, this new maximum is also stored on the tag (step 56).

Figure 6:
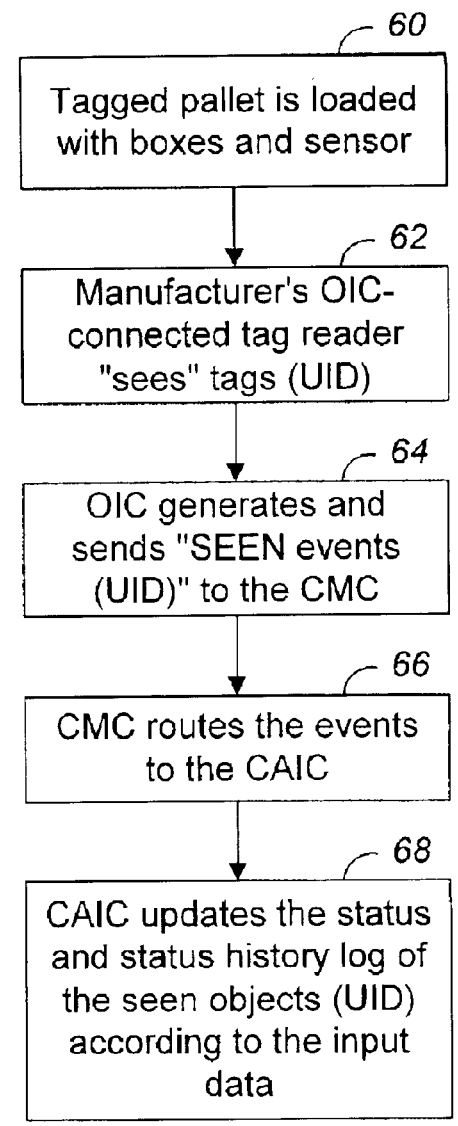
FIG. 6 provides an example of the system's response to an event such as the loading of boxes onto a pallet.

FIG. 6 illustrates the system's response to the loading of boxes onto the pallet with a sensor (step 60). The manufacturer's OIC-connected tag reader senses the tags and their UIDs (step 62) and generates SEEN events for the UIDs that it sends to the CMC (step 64). The CMC routes these events to the CAIC (step 66). The CAIC updates the status and status history log of the objects identified by the sensed UIDs according to the input data from the events (step 68).

When Shipper Y's OIC-connected readers sense a tag, the CAIC updates the system. FIG. 7 illustrates this update operation. The shipper's OIC-connected tag reader senses the tags of the boxes on the pallet including the sensor tag, reading their UIDs and $T_{max}$ data (step 70). The OIC generates and sends SEEN events to the CMC with the data (step 71). The CMC routes the events to the CAIC (step 72). The CAIC updates the status and history log of the corresponding objects according to the received input data (step 73). The CAIC determines whether the $T_{max}$ is within limits (step 74). If not, the CAIC sends an alert event to the CMC ("no" branch from step 74; step 75), and the CMC routes the alert to the manufacturer's and the shipper's ERP applications (step 76).

Figure 8:
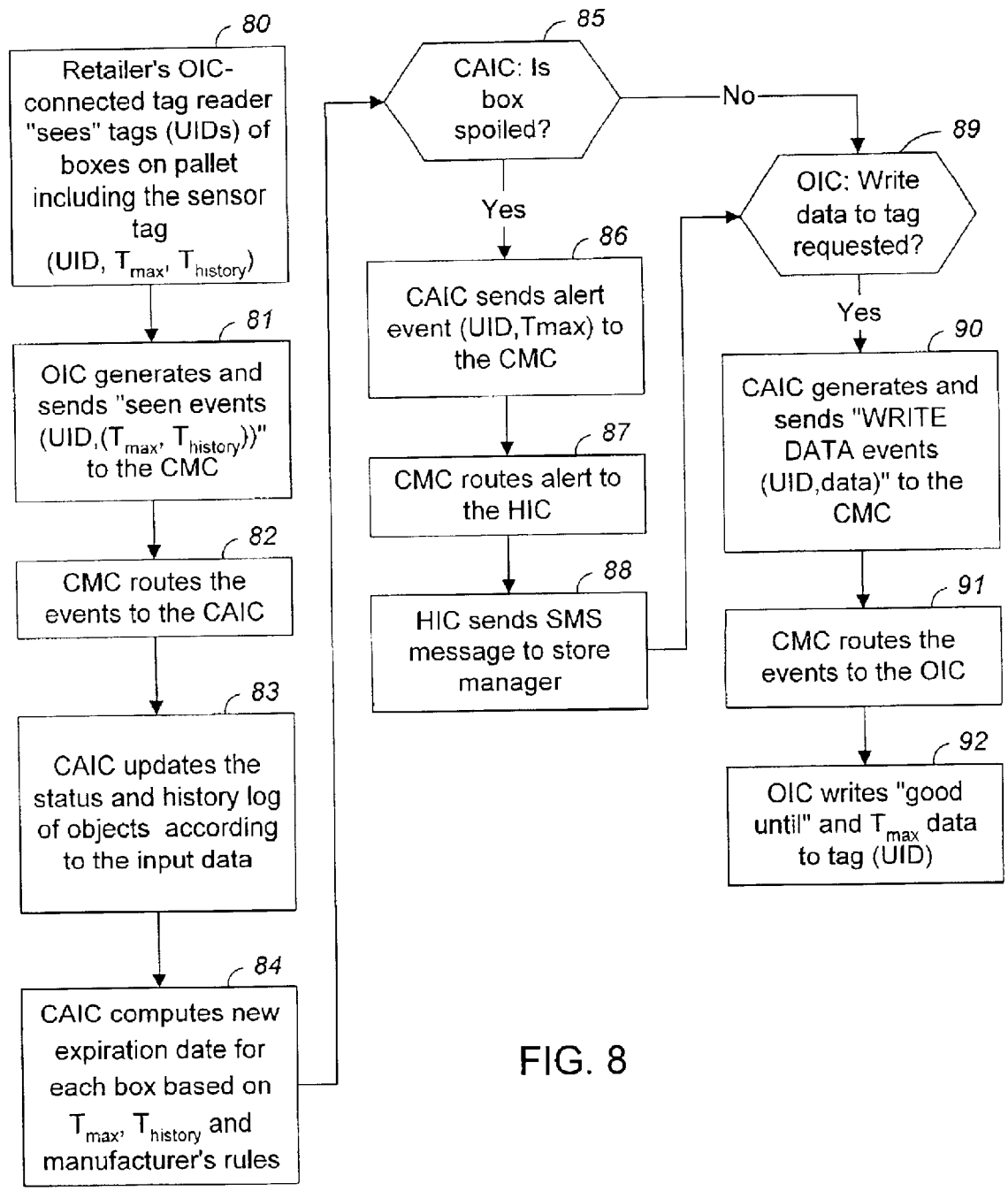
FIG. 8 illustrates update, reading, and alert operations in accordance with the invention.

On receipt of the shipment, Retailer Z reads and validates the products' actual maximum temperature data from the attached RFID tags and expiration date. FIG. 8 also illustrates this reading operation.

When spoiled boxes are detected, they are identified and the CAIC alerts the store manager using the HIC component. SMS (Short Message Service) messages, pager messages, or any other convenient form of message transmission, can be used for this purpose. FIG. 8 also illustrates this alert operation where a retailer's OIC-connected tag reader senses and reads the UIDs of tags of boxes on a pallet include a sensor tag carrying a UID, a maximum temperature $T_{max}$ and a temperature history $T_{history}$ (step 80). The OIC generates and sends to the CMC SEEN events with the UID, $T_{max}$ and $T_{history}$ information (step 81). The CMC routes the events to the CAIC (step 82). The CAIC updates the status and history log of objects according to the input data (step 83). The CAIC also computes a new expiration date for each box based on the $T_{max}$ and $T_{history}$ information and the manufacturer's rules (step 84). If the CAIC determines that the box is spoiled ("yes" branch from decision step 85), the CAIC sends an alert event with UID and $T_{max}$ to the CMC (step 86), which routes the alert to the HIC (step 87). The HIC then sends an SMS message alerting the retail store manager (step 88). Whether or not the box is spoiled, the OIC determines whether there is a request that data be written to the tag (step 89), and if it there is, the CAIC generates and sends WRITE DATA events with the UID and data for the tags to the CMC (step 90). The CMC routes these events to the OIC (step 91), which writes "good until" and $T_{max}$ data to the tags (step 92).

The system can receive context information from third party providers, for example, traffic or weather information. In general, information can be brought into the system either by having the providers push the information, or having the system pull the information. Having such information enables the system to report or forecast shipping delays or other situations that can affect the movement or condition of introduced articles. FIG. 9 illustrates this implemented with the providers feeding information into the system. In this illustration, a traffic information provider generates an INTRODUCE context object event with a UID and attributes and sends the event to the CMC (step 120), which routes the event to an OIC (step 122). The receiving OIC generates a NEW context object event with UID to the CMC (step 124), which routes the event to the CAIC (step 126). The CAIC determines that the event is of the type NEW context object event ("yes" branch of decision step 128), generates a new context object for the UID according to the specified data (step 130), and stores the new object data (step 132).

The system can be applied to other scenarios. The system supports the development of a range of new and enhanced applications across industries on a local to global scale. Other applications of the system includes supply chain management, asset tracking management, security and access control, transportation, toll collection, point of sales applications, and baggage handling. These examples are further described below.

Supply Chain Management

RFID systems are ideally suited for the identification of high-unit high-value products moving through an assembly process (such as automobile or agricultural equipment production). RFID systems also offer the durability essential for permanent identification of product carriers such as boxes, crates, and pallets. Other applications within supply chain management include work-in-progress tracking and parcel delivery.

Asset Tracking and Management

Asset tracking and management applications include those for monitoring the flow of equipment, people, and documents within a space such as a building, yard, or terminal, for example, to tighten control over assets and keep good track of articles, including individuals. Specific applications within asset management include: Records/document tracking, people tracking, yard management, and equipment tracking.

Security and Access Control

The movement and use of valuable equipment and personnel resources can be monitored through transponders attached to equipment or carried by the equipment or personnel. Transponders can also be embedded in credit card size security badges. Home security call systems and building access are two examples of security and access control applications.

Transportation

Transponders can be attached to vehicles (e.g., aircraft, rail cars, trucks) and can contain important information about the vehicle and its contents. Transportation applications include aircraft identification, rail car and shipping container tracking, public transportation ticketing, and weigh station applications.

Toll Collection

Toll collection applications involve attaching a transponder to a vehicle. The transponder transmits a code, which identifies a prepaid account, to a reader which automatically deducts the toll from the prepaid account.

Point of Sale

These applications include electronic surveillance of retail items, forgery prevention, and sales transactions and usually involve tagging individual retail items with low cost transponders, which are essentially active tags.

Baggage Handling

In a baggage handling application, airline luggage is tagged with RFID transponders such as smart labels to allow airline baggage handling operations to track baggage from the moment a traveler checks into an airport to the moment the traveler reaches his final destination.

Conclusion

The invention has been described in terms of particular embodiments. Other embodiments are within the scope of the claims. For example, the steps of the invention can be performed in a different order and still achieve desirable results. The system is flexible and offers many business methods for tracking articles. In one method, one or more customers subscribe to the system, which is provided by a service provider who distributes the services over a network such as the Internet. In this case, the customers need not procure components or the entire system, thereby saving capital costs. Alternatively, the customers procure components of or the entire system, thereby saving operational cost. Alternatively, the system can support any combination of the described business methods. For example, some customer can subscribe to the system and some customer can procure components or the entire system.

What is claimed is:

1. A method, comprising:

receiving from a first enterprise multiple instances of tag-read-data, each instance including information read automatically from a tag bound to an article including at least a unique digital identifier, each instance also including status information including a location of the corresponding tag and its bound article, the multiple instances of tag-read-data received from the first enterprise collectively including information read from tags bound to first multiple articles, the tag-read-data including data derived from a first data processing system of the first enterprise;

using the tag-read-data received from the first enterprise to maintain virtual representatives in a virtual world, the virtual representatives including a virtual representative for each one of the multiple articles, each virtual representative representing the status of its corresponding article;

receiving from a second enterprise multiple instances of second tag-read-data, each instance including information read automatically from a tag bound to an article including at least a unique digital identifier, each instance also including status information including a location of the corresponding tag and its bound article, the multiple instances of tag-read-data received from the second enterprise collectively including information read from a tag bound to at least one of the first multiple articles, the tag-read-data received from the second enterprise including data derived from a second data processing system of the second enterprise;

using the tag-read-data received from the second enterprise to maintain virtual representatives in the virtual world, the virtual representatives including a virtual representative for each of the second multiple articles, each a virtual representative representing the status of its corresponding article, where tag-read-data received from either enterprise for a particular article is used to update the a virtual representative corresponding to the article;

making available information from updated virtual representatives and from the virtual world to both the first enterprise and the second enterprise;

receiving one or more instances of context information, each instance describing an associated non-taggable environmental circumstance, the context information indicating a status including a location of the circumstance, the multiple instances of context information collectively including information describing multiple circumstances;

using the received context information to maintain a virtual representative far each of the associated circumstances in the virtual world, each virtual representative representing the status of its corresponding circumstance; and detecting interactions occurring in the virtual world between the circumstances and the articles as represented by their respective virtual representatives.

2. The method of claim 1, wherein:
the information in the virtual world about articles is mapped to virtual-world-wide standardized dimensions of time, three-dimensional space, and unique identity, whereby articles can be tracked relative to each other through space and time.

3. The method of claim 2, wherein:
location of articles is represented in the virtual world by latitudes, longitudes, and altitudes.

4. The method of claim 1, further comprising:
receiving sensor information obtained from a sensor associated with an article; and
updating the virtual representative of the article with the sensor information.

5. The method of claim 1, further comprising:
updating the virtual representatives whenever that status of their associated articles changes as reflected in information received by a system operating to maintain the virtual world.

6. The method or claim 1, further comprising:
generating an alert for a user of the virtual world whenever a detected interaction is determined to affect any of the articles represented in the virtual world, where the user is a human being or a computer program.

7. The method of claim 1, further comprising:
receiving hierarchy information describing a hierarchy among articles represented in the virtual world; and
using the received hierarchy information to create a virtual representation of the hierarchy.

8. The method of claim 7, wherein:
the hierarchy is a relationship among articles in which some particular articles are contained within another article.

9. The method of claim 1, wherein:
the tags bound to the first multiple articles include radio frequency identification tags.

10. The method of claim 9, wherein:
each of the radio frequency identification carries an ePC electronic product code as a unique identifier.

11. A computer program product, tangibly stored on a computer-readable medium, for context-aware and real time tracking of articles, the product comprising instructions operable to cause a programmable processor to:

receive from a first enterprise multiple instances of tag-read-data, each instance including information read from a tag bound to an article, including at least a unique digital identifier read automatically from the tag, each instance also including status information including a location of the corresponding tag and its bound article, the multiple instances of tag-read-data received from a first enterprise collectively including information read from tags bound to first multiple articles, the tag-read-data including data derived from a first data processing system of the first enterprise;

use the tag-read-data received from the first enterprise to maintain virtual representatives in a virtual world, the virtual representative including a virtual representative for each one of the multiple articles, each virtual representative representing the status of its corresponding article;

receive from a second enterprise multiple instances of second tag-read-data, each instance including information read from a tag bound to an article, including at least a unique digital identifier read automatically from the tag, each instance also including status information including a location of the corresponding tag and its bound article, the multiple instances of tag-read-data received from a second enterprise collectively including information read from a tag bound to at least one of the first multiple articles, the tag-read-data received from a second enterprise including data derived from a second data processing system of the second enterprise;

use the tag-read-data received from the second enterprise to maintain virtual representatives in the virtual world, the virtual representatives including a virtual representative for each one of the second multiple articles, each a virtual representative representing the status of its corresponding article, where tag-read-data received from either enterprise for a particular article is used to update the virtual representative corresponding to the article;

make available information from updated virtual representatives and from the virtual world to both the first enterprise and the second enterprise;

receive one or more instances of context information, each instance describing an associated non-taggable environmental circumstance, the context information indicating a status including a location of the circumstance, the multiple instances of context information collectively including information describing multiple circumstances;

use the received context information to maintain a virtual representative for each of the associated circumstances in the virtual world, each virtual representative representing the status of its corresponding circumstance; and detect interactions occurring in the virtual world between the circumstances and the articles as represented by their respective virtual representatives.

12. The product of claim 11, wherein:

the information in the virtual world about articles is mapped to virtual-world-wide standardized dimensions of time, three-dimensional space, and unique identity, whereby articles can be tracked relative to each other through space and time.

13. The product of claim 12, wherein:

location of articles is represented in the virtual world by latitudes, longitudes, and altitudes.

14. The product of claim 11, further comprising instructions to:

receive sensor information obtained from a sensor associated with an article; and update the virtual representative of the article with the sensor information.

15. The product of claim 11, further comprising instructions to:

update the virtual representatives whenever that status of their associated articles changes as reflected in information received by a system operating to maintain the virtual world.

16. The product of claim 11, comprising instructions to:

generate an alert for a user of the virtual world whenever a detected interaction is determined to affect any of the articles represented in the virtual world, where the user is a human being or a computer program.

17. The product of claim 11, further comprising instructions to:

receive hierarchy information describing a hierarchy among articles represented in the virtual world; and use the received hierarchy information to create a virtual representation of the hierarchy.

18. The method of claim 17, wherein:

the hierarchy is a relationship among articles in which some particular articles are contained within another article.

19. The product of claim 11, wherein:

the tags bound to the first multiple articles include radio frequency identification tags.

20. The method of claim 19, wherein:

each of the radio frequency identification carries an ePC electronic product code as a unique identifier.

21. A system, comprising:

means for receiving from a first enterprise multiple instances of tag-read-data, each instance including information read automatically from a tag bound to an article including at least a unique digital identifier, each instance also including status information including a location of the corresponding tag and its bound article, the multiple instances of tag-read-data received from the first enterprise collectively including information read from tags bound to first multiple articles, the tag-read-data including data derived from a first data processing system of the first enterprise;

means for using the tag-read-data received from the first enterprise to maintain virtual representatives in a virtual world, the virtual representatives including a virtual representative for each one of the multiple articles, each virtual representative representing the status of its corresponding article;

means for receiving from a second enterprise multiple instances of second tag-read-data, each instance including information read automatically from a tag bound to an article including at least a unique digital identifier, each instance also including status information including a location of the corresponding tag and its bound article, the multiple instances of tag-read-data received from the second enterprise collectively including information read from a tag bound to at least one of the first multiple articles, the tag-read-data received from the second enterprise including data derived from a second data processing system of the second enterprise;

means for using the tag-read-data received from the second enterprise to maintain virtual representatives in the virtual world, the virtual representatives including a virtual representative for each of the second multiple articles, each a virtual representative representing the status of its corresponding article, where tag-read-data received from either enterprise for a particular article is used to update the virtual representative corresponding to the article;

means for making available information from updated virtual representatives and from the virtual world to both the first enterprise and the second enterprise;

means for receiving one or more instances of context information, each instance describing an associated non-taggable circumstance, the context information indicating a status including a location of the circumstance, the multiple instances of context information collectively including information describing multiple circumstances;

means for using the received context information to maintain a virtual representative for each of the associated circumstances in the virtual world, each virtual representative representing the status of its corresponding circumstance; and means for detecting interactions occurring in the virtual world between the circumstances and the articles as represented by their respective virtual representatives.

22. The system of claim 21, wherein:

the information in the virtual world about articles is mapped to virtual-world-wide standardized dimensions of time, three-dimensional space, and unique identity, whereby articles can be tracked relative to each other through space and time.

23. The system of claim 22, wherein:

location of articles is represented in the virtual world by latitudes, longitudes, and altitudes.

24. The system of claim 21, further comprising:

means for receiving sensor information obtained from a sensor associated with an article; and means for updating the virtual representative of the article with the sensor information.

25. The system of claim 21, further comprising:

means for updating the virtual representatives whenever that status of their associated articles changes as reflected in information received by a system operating to maintain the virtual world.

26. The system of claim 21, further comprising:

means for generating an alert for a user of the virtual world whenever a detected interaction is determined to affect any of the articles represented in the virtual world, where the user is a human being or a computer program.

27. The system of claim 21, further comprising:

means for receiving hierarchy information describing a hierarchy among articles represented in the virtual world; and means for using the received hierarchy information to create a virtual representation of the hierarchy.

28. The system of claim 27, wherein:

the hierarchy is a relationship among articles in which some particular articles are contained within another article.

29. The system of claim 21, wherein:

the tags bound to the first multiple articles include radio frequency identification tags.

30. The system of claim 27, wherein:

each of the radio frequency identification carries an ePC electronic product code as a unique identifier.

31. The method of claim 1, wherein the environmental circumstance is a traffic condition or a weather condition.

32. The product of claim 11, wherein the environmental circumstance is a traffic condition or a weather condition.

33. The system of claim 21, wherein the environmental circumstance is a traffic condition or a weather condition.

* * * * *